(12) United States Patent
Kolb

(10) Patent No.: US 10,527,364 B2
(45) Date of Patent: Jan. 7, 2020

(54) HEAT EXCHANGER MANIFOLD WITH HEADER GROOVE REINFORCEMENT MEMBER

(71) Applicant: ENTEREX AMERICA LLC, Westbrook, CT (US)

(72) Inventor: John A. Kolb, Westbrook, CT (US)

(73) Assignee: ENTEREX AMERICA LLC, Westbrook, CT (US)

( * ) Notice: Subject to any disclaimer, the term of this patent is extended or adjusted under 35 U.S.C. 154(b) by 0 days.

(21) Appl. No.: 15/905,208

(22) Filed: Feb. 26, 2018

(65) Prior Publication Data
US 2018/0252480 A1  Sep. 6, 2018

Related U.S. Application Data

(60) Provisional application No. 62/466,452, filed on Mar. 3, 2017.

(51) Int. Cl.
*F28F 9/02* (2006.01)
*F28D 7/00* (2006.01)
*B23P 15/26* (2006.01)

(52) U.S. Cl.
CPC ............ *F28F 9/0246* (2013.01); *B23P 15/26* (2013.01); *F28D 7/0066* (2013.01)

(58) Field of Classification Search
CPC .... F28D 7/0066; F28D 1/05316; B23P 15/26; F28F 21/062; F28F 9/0226; F28F 2225/08; F28F 2230/00; F28F 2275/04
See application file for complete search history.

(56) References Cited

U.S. PATENT DOCUMENTS

| | | | |
|---|---|---|---|
| 1,939,034 A | 12/1933 | Bennett | |
| 4,324,290 A * | 4/1982 | Moranne | F28D 1/0535 165/149 |
| 4,331,201 A * | 5/1982 | Hesse | B23P 11/00 165/149 |
| 4,351,390 A * | 9/1982 | Argyle | F28F 9/0226 165/149 |
| 4,401,157 A * | 8/1983 | Cadars | F28D 1/053 165/173 |

(Continued)

*Primary Examiner* — Claire E Rojohn, III
(74) *Attorney, Agent, or Firm* — DeLio Peterson & Curcio LLC; David R. Pegnataro

(57) ABSTRACT

A header for a heat exchanger manifold comprises a header plate with a periphery, a plurality of tube openings within the header plate periphery adapted to connect to tubes of a heat exchanger core, a groove around the periphery of the header plate to receive a foot of a tank, the groove comprising inner and outer vertical walls and a lower wall disposed therebetween, and a header groove reinforcement member secured to and extending along an outer surface of the header groove and along at least a portion of the length of the header plate in a direction transverse to the header groove. The header groove reinforcement member comprises a first portion extending along at least a portion of a length of the outer vertical wall in the direction of a distal end, and a second portion extending past a proximal end of the inner vertical wall and along at least a portion of the length of the header plate. The groove reinforcement member prevents distortion of the header groove under service pressure during operation of the heat exchanger.

20 Claims, 4 Drawing Sheets

(56) References Cited

U.S. PATENT DOCUMENTS

| | | | | |
|---|---|---|---|---|
| 4,546,823 A * | 10/1985 | Melnyk | F28F 9/0226 165/149 |
| 4,645,002 A * | 2/1987 | Keyzer | F28F 9/0226 165/173 |
| 4,651,815 A * | 3/1987 | Logic | F28F 9/0226 165/148 |
| 4,707,905 A * | 11/1987 | Clair | F28F 9/0226 165/173 |
| 4,899,815 A * | 2/1990 | Bosch | F28F 9/0226 165/173 |
| 4,917,182 A * | 4/1990 | Beamer | F28F 9/0226 165/149 |
| 4,997,035 A * | 3/1991 | Beatenbough | F28F 9/0226 165/149 |
| 5,195,579 A * | 3/1993 | Buchanan | F28F 9/0224 165/149 |
| 5,195,581 A * | 3/1993 | Puntambekar | F28F 9/0226 156/91 |
| 5,195,582 A * | 3/1993 | Haase | F28F 9/0226 165/149 |
| 5,201,368 A * | 4/1993 | Kroetsch | F28F 9/0226 165/149 |
| 5,257,662 A * | 11/1993 | Osborn | F28F 9/001 165/149 |
| 5,311,933 A * | 5/1994 | Lee | F28F 9/0226 165/149 |
| 5,311,934 A | 5/1994 | Potier | |
| 5,836,384 A | 11/1998 | Wijkstrom et al. | |
| 5,944,095 A * | 8/1999 | Fukuoka | F28F 9/0224 165/173 |
| 6,675,883 B1 | 1/2004 | DeKeuster et al. | |
| 7,121,329 B2 * | 10/2006 | Shields | F28F 9/001 165/149 |
| 7,234,511 B1 | 6/2007 | Lesage | |
| 7,341,098 B2 * | 3/2008 | Brost | F28D 1/05366 165/149 |
| 7,640,971 B2 * | 1/2010 | Kolb | B21D 53/08 165/149 |
| 7,775,266 B2 * | 8/2010 | Freitag | F28F 9/0226 165/158 |
| 9,082,446 B2 | 7/2015 | Choi et al. | |
| 9,239,196 B2 * | 1/2016 | Ghiani | F28F 9/00 |
| 9,488,417 B2 * | 11/2016 | Garret | F28D 7/1684 |
| 10,215,509 B2 * | 2/2019 | Somhorst | F28D 1/00 |
| 2002/0029874 A1 * | 3/2002 | Boisselle | F28F 9/0226 165/178 |
| 2005/0133208 A1 * | 6/2005 | Powers | F28F 9/0226 165/149 |
| 2006/0137866 A1 * | 6/2006 | Hernandez | F28F 9/0226 165/149 |
| 2008/0185134 A1 | 8/2008 | Hoehne et al. | |
| 2008/0308263 A1 * | 12/2008 | Kolb | B21D 53/08 165/149 |
| 2012/0247742 A1 * | 10/2012 | Mizuno | F28F 9/0209 165/173 |
| 2013/0299149 A1 * | 11/2013 | Riondet | F28F 9/0226 165/173 |
| 2016/0102925 A1 * | 4/2016 | McWain | F28F 9/0226 165/173 |
| 2018/0252480 A1 * | 9/2018 | Kolb | F28F 9/0226 |

* cited by examiner

HEAT EXCHANGER MANIFOLD WITH HEADER GROOVE REINFORCEMENT MEMBER

RELATED APPLICATIONS

This application claims priority to U.S. Provisional Patent App. No. 62/466,452 filed on Mar. 3, 2017, the entire disclosure of which is incorporated herein by reference.

BACKGROUND OF THE INVENTION

1. Field of the Invention

The present invention relates to engine cooling radiators and, more particularly, to radiator cores which utilize aluminum headers and plastic inlet/outlet tanks.

2. Description of Related Art

In the field of automobile engine-cooling radiators, the common method of construction of the radiator core (consisting of coolant-carrying tubes, cooling fins and inlet and outlet headers into which both ends of the tubes are sealed) is to form the core of brazed aluminum. Plastic inlet and outlet tanks are then connected to grooves in the headers, with a rubber gasket seal between them, and the mechanical connection of the headers to the tanks is by means of crimping or bending over header tabs over a lip or foot around the periphery of the plastic tanks. The assembly of a plastic tank to an aluminum header, with a rubber sealing gasket between them, constitutes a radiator or heat exchanger manifold. In service, the cooling system pressure in the tanks tends to force the tanks away from the headers and "unbend" the tabs, distorting the header grooves, and eventually allowing leakage past the gasket seal. Many design ideas have been tried, with varying success, to improve the integrity of the tank-to-header seal.

One such solution has been providing formed ribs on the header tabs, which strengthen the tabs against unbending. However, it has been shown that the biggest contributor to the failure of tank-to-header seals is not tab unbending, but rather header groove distortion. Therefore, strengthening the header tabs does not help much in preventing tank-to-header seal leakage.

Another potential solution has been the use of steel crimp strips to clamp the tanks to the headers, which has been used commercially, in spite of the increased cost associated with additional material and additional assembly labor. When properly applied, such crimp strips can help to keep the tanks clamped to the headers. However, in service, steel crimp strips suffer from serious corrosion problems resulting in unclamping and eventually severe leakage. Changing the material to stainless steel only increases the material cost and still leaves the problem of dissimilar materials between the crimp strips and the headers.

Another known approach to the tank-to-header leakage problem uses a header which has slots in the outer header groove wall. During assembly of the radiator, a rubber O-ring type gasket is placed in the header groove and a tank is assembled to the header, compressing the gasket. When the gasket is compressed the desired amount, a key strip is inserted through the slots in the header groove wall to retain the tank in place in the header groove at the desired amount of gasket compression. However, the seal gland formed by the bottom and sides of the header groove and the bottom of the tank foot is not a carefully-machined seal gland, which would permit carefully-controlled compression of the seal. Rather, the sheet metal header, with its header groove, bends and distorts under pressure, relieving gasket compression and allowing leakage.

It has been found that it is far better not to treat the header groove and tank foot as a typical seal gland with its demand for maintaining precise seal compression. Rather, the rubber seal should be trapped between the bottom of the tank foot and the walls and bottom of the header groove and compressed until it entirely fills the resulting volume as an incompressible fluid. Under such conditions, slight distortions of the header groove will not result in leakage. It then remains to minimize header groove distortion.

U.S. Pat. No. 7,640,971 to Kolb, entitled "Heat Exchanger Manifold Sealing System" addressed the overall tank-to-header leakage problem by increasing the depth of the header grooves and the length of the tank foot. In this design, the top of the foot of the plastic tank was provided with a small lip in order to concentrate the tab unbending force close to the bend of the tab. The result is that the unbending force tends not to unbend the tab, but rather to distort the header groove. Such header groove distortion leads to relieving gasket compression and allowing leakage over time.

Therefore, a need exists for a means for strengthening the header groove in order to resist deformation under service pressure, without significantly increasing material or labor costs.

SUMMARY OF THE INVENTION

Bearing in mind the problems and deficiencies of the prior art, it is therefore an object of the present invention to provide an improved heat exchanger manifold that is useful in plastic tank and aluminum header applications.

It is another object of the present invention to provide an improved heat exchanger manifold that reduces deformation of the header groove during operation and use of the heat exchanger.

A further object of the invention is to provide an improved heat exchanger manifold which maintains tank-to-header seal integrity for a longer period of time than prior art designs.

It is yet another object of the present invention to provide an improved heat exchanger manifold which has an increased thickness and strength of the header groove in critical areas.

It is still yet another object of the present invention to provide an improved heat exchanger manifold which maintains tank-to-header seal integrity for a longer period of time than prior art designs, without substantially increasing the costs of labor or materials.

Still other objects and advantages of the invention will in part be obvious and will in part be apparent from the specification.

The above and other objects, which will be apparent to those skilled in the art, are achieved in the present invention which is directed to a heat exchanger manifold comprising a header having a header plate with a periphery, a plurality of tube openings within the header plate periphery adapted to connect to tubes of a heat exchanger core, and a groove around the periphery of the header plate to receive a foot of a tank, the groove comprising inner and outer vertical walls and a lower wall disposed therebetween. A tank has an opening for mating with the header and a foot extending substantially around a periphery of the opening and received in the header groove. At least one plastically deformable tab extends from an edge of the header groove and is bent inward over the tank foot to secure the tank to the header. A header groove reinforcement member is secured to and extends along an outer surface of the header groove, and further extends along at least a portion of a length of the header plate in a direction transverse to the header groove.

The header groove reinforcement member comprises a first portion extending along at least a portion of a length of the outer vertical wall in the direction of a distal end of the outer vertical wall and may end at a distance from the distal end, and a second portion extending past a proximal end of the inner vertical wall and along at least a portion of the length of the header plate. The header groove reinforcement member second portion ends at a distance from a first of the plurality of tube openings within the header plate periphery. The header groove reinforcement member further has a midportion spanning a length of the header groove lower wall.

The header and header groove reinforcement member may each be comprised of a metal sheet, such as braze-clad aluminum, and the header groove reinforcement member may be brazed to the outer surface of the header groove during core brazing. The header groove reinforcement member is positioned to increase a thickness of the header along the header groove by a ratio of at least about 2:1. The header groove reinforcement member is positioned on the outer surface of the header groove to prevent distortion of the header groove during operation of the heat exchanger caused by internal pressure attempting to bend the header groove inner vertical wall inwardly in the direction of the heat exchanger core tubes. In one or more embodiments, a resilient sealing gasket may be positioned between the tank foot and the header groove to seal the tank to the header.

In another aspect, the present invention is directed to a header for a heat exchanger manifold, comprising a header plate with a periphery, a plurality of tube openings within the header plate periphery adapted to connect to tubes of a heat exchanger core, and a groove around the periphery of the header plate to receive a foot of a tank, the groove comprising inner and outer vertical walls and a lower wall disposed therebetween. The header further comprises a header groove reinforcement member secured to and extending along an outer surface of the header groove and along at least a portion of the length of the header plate in a direction transverse to the header groove.

The header groove reinforcement member comprises a first portion extending along at least a portion of the length of the groove outer vertical wall in the direction of a distal end of the outer vertical wall and may end at a distance from the distal end, and a second portion extending past a proximal end of the inner vertical wall and along at least a portion of the length of the header plate and ending at a distance from a first of the plurality of tube openings within the header plate periphery. The header groove reinforcement member further has a midportion spanning a length of the header groove lower wall.

The header and header groove reinforcement member may each be comprised of a metal sheet, such as braze-clad aluminum, and the header groove reinforcement member may be brazed to the outer surface of the header groove during core brazing. The header groove reinforcement member is positioned to increase a thickness of the header along the header groove by a ratio of at least about 2:1.

In yet another aspect, the present invention is directed to a method of assembling a heat exchanger manifold. The method comprises: providing a header having a header plate with a periphery, a plurality of tube openings within the header plate periphery adapted to connect to tubes of a heat exchanger core, and a groove around the periphery of the header plate to receive a foot of a tank, the groove comprising inner and outer vertical walls and a lower wall disposed therebetween, and at least one plastically deformable tab extending from an edge of the header groove; providing a header groove reinforcement member having first and second portions adapted to be secured to an outer surface of the header groove; and providing a tank having an opening for mating with the header and a foot extending substantially around a periphery of the opening and received in the header groove. The method further comprises securing the header groove reinforcement member to the outer surface of the header groove such that the header groove reinforcement member first portion extends along at least a portion of the length of the groove outer vertical wall in the direction of a distal end of the outer vertical wall, and the second portion extends past a proximal end of the header groove inner vertical wall and along at least a portion of the length of the header plate. The method comprises mating the tank to the header so that the tank foot is received in the header groove, and bending an upper portion of the at least one tab inward over the tank foot to secure the tank to the header.

The header and header groove reinforcement member may each be comprised of a metal sheet, such as braze-clad aluminum, and the step of securing the header groove reinforcement member to the outer surface of the header groove may comprise brazing the reinforcement member to the outer surface of the header groove during core brazing.

The method may further comprise securing the header groove reinforcement member to the outer surface of the header groove such that the reinforcement member first portion ends at a distance from the outer vertical wall distal end and the second portion ends at a distance from a first of the plurality of tube openings within the header plate periphery.

In an embodiment, the tank foot may have a flat lower surface and the method may further include, prior to mating the tank to the header, placing in the header groove a resilient sealing gasket, the gasket having an elliptical cross section in an undeformed state; and subsequent to mating the tank to the header, deforming the sealing gasket by contact with the tank foot to fill essentially the entire region between the header groove and the tank foot flat lower surface and seal the tank to the header.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

Figure 2:
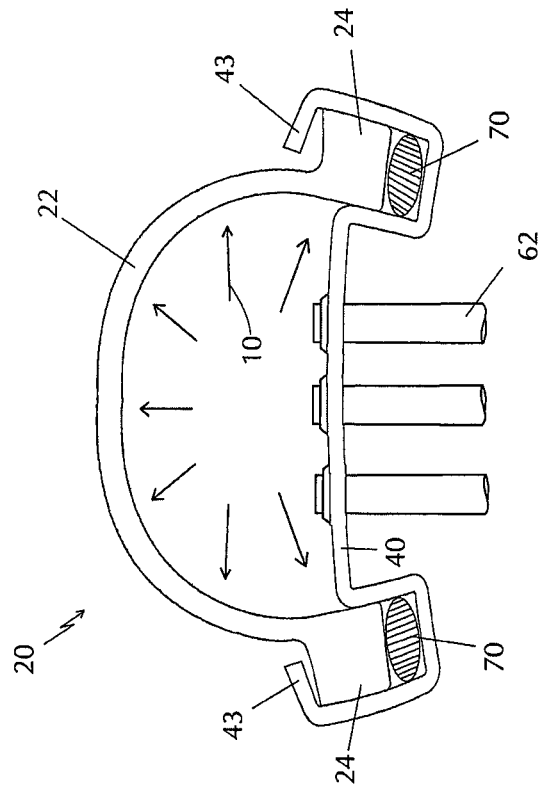
FIG. 2 is a cross-sectional elevational view of a typical radiator manifold of the prior art as shown in FIG. 1 in operation, showing bulging of the tank top and side walls resulting in "unbending" of the crimped header tabs securing the aluminum header to the plastic tank due to internal pressure.

In describing the embodiments of the present invention, reference will be made herein to FIGS. 1-6 of the drawings in which like numerals refer to like features of the invention.

As used herein, a heat exchanger manifold consists of an inlet or outlet tank for passage of the heat exchanger coolant, a header for attachment to the tubes of a heat exchanger core, and a seal between the tank and header joint. Typically, the tank may be made of an otherwise conventional molded plastic such as glass-reinforced Nylon 6/6 material, and the header may be made of a metal such as braze-clad aluminum. Other types of tank and header materials may also be employed. The heat exchanger manifold of the present invention may be used in heavy-duty truck or other motor vehicle heat exchangers, such as in automobile radiators of superior durability, or in other heat exchanger applications where strength, vibration resistance and long life are required.

Certain terminology is used herein for convenience only and is not to be taken as a limitation of the invention. For example, words such as "upper," "lower," "left," "right," "horizontal," "vertical," "upward," and "downward" merely describe the configuration shown in the drawings. For purposes of clarity, the same reference numbers may be used in the drawings to identify similar elements.

Additionally, in the subject description, the word "exemplary" is used to mean serving as an example, instance or illustration. Any aspect or design described herein as "exemplary" is not necessarily intended to be construed as preferred or advantageous over other aspects or design. Rather, the use of the word "exemplary" is merely intended to present concepts in a concrete fashion.

Figure 1:
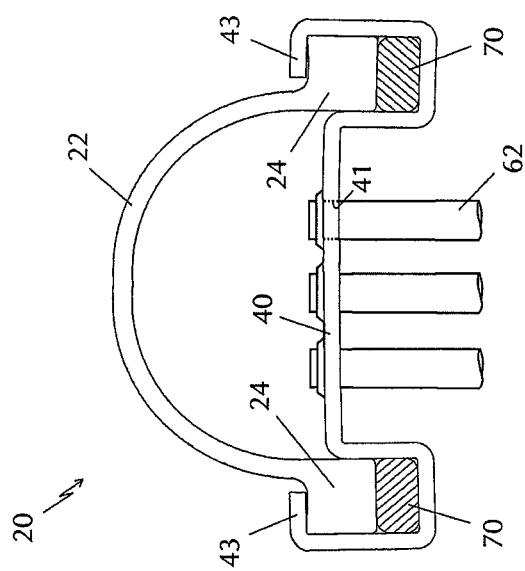
FIG. 1 is a cross-sectional elevational view of a typical radiator manifold of the prior art at rest, showing a plastic radiator tank mated and sealed to a tabbed aluminum radiator core header with rubber sealing gaskets.

Referring now to FIG. 1, a cross-sectional elevational view of a typical manifold of the prior art is shown. Generally, a plastic radiator tank is attached to a tabbed aluminum radiator core header with rubber gaskets and is held in place by crimping the header tabs over a foot or lip surrounding the tank to provide compression on the gasket. As shown in FIG. 1, heat exchanger manifold 20 includes a tank 22 having an opening on a lower side thereof for mating with a header 40, and a foot or lip 24 extending outward from the tank opening around substantially the entire periphery of the opening. A groove extends around the periphery of header 40 for mating with the foot or lip 24 of the tank 22. The groove is formed by an inner vertical wall, an outer vertical wall, and a lower wall connecting the vertical walls. As shown in FIG. 1, the upper portion of the outer wall comprises a tab 43, which is crimped or bent over the tank foot 24 to secure the tank to the header. In most constructions, a plurality of spaced tabs 43 extend substantially around the periphery of the header groove.

Disposed in the bottom of the header groove is a continuous ring-type elastomeric gasket 70. After placing gasket 70 in the bottom of the header groove, tank foot or lip 24 is received over the gasket so that the lower surface of the foot contacts the upper surface of gasket 70. To secure the header to the tank, the tabs 43 are bent inwards so that they contact the top surface of foot 24. As the tabs 43 are crimped over the tank foot 24, the lower surface of the foot is forced down against the top of elliptical cross section gasket 70 toward the bottom surface of the header groove. These forces cause the elliptical gasket to be deformed so that the gasket fills essentially the entire region between the header groove walls and the lower surface of the tank foot. Sealing stress is created as the rubber pushes out radially against the constraining surfaces of the foot and the header groove.

The design of the typical plastic radiator tank and header of the prior art, as described above, has several disadvantages as tank size increases. Significantly, as the size of the plastic radiator tank becomes larger, forces resulting from internal pressure in the tank during operation increase to the point where the tabs 43 can relax or unbend, losing their grip on the tank foot or lip 24, releasing compression on the gasket 70, and allowing coolant leakage. In addition, as radiator tanks become larger, they become more susceptible to bulging and eventual rupture as a result of internal pressure. FIG. 1 shows a cross-sectional view of a typical heat exchanger manifold 20 of the prior art at rest, showing a plastic radiator tank 22 mated and sealed to a tabbed aluminum radiator core header 40 with rubber gaskets 70, as described above. A plurality of tubes 62 of an otherwise conventional radiator core are sealed within openings 41 in header plate 40.

FIG. 2 shows the effects of increasing internal pressure during operation of a typical prior art heat exchanger. As shown in FIG. 2, as pressure (represented by arrows 10) inside the tank 22 increases during operation, the top and sides of the tank become susceptible to bulging, causing tabs 43 to relax or unbend, losing their grip on the tank foot 24 and reducing compression on the sealing gasket 70, allowing fluid leakage. The internal pressure may also cause bending of the header where the tank foot mates with the header groove, causing header groove distortion. As radiator tanks become larger, they become more susceptible to bulging and eventual rupture as a result of internal pressure.

Figure 4:
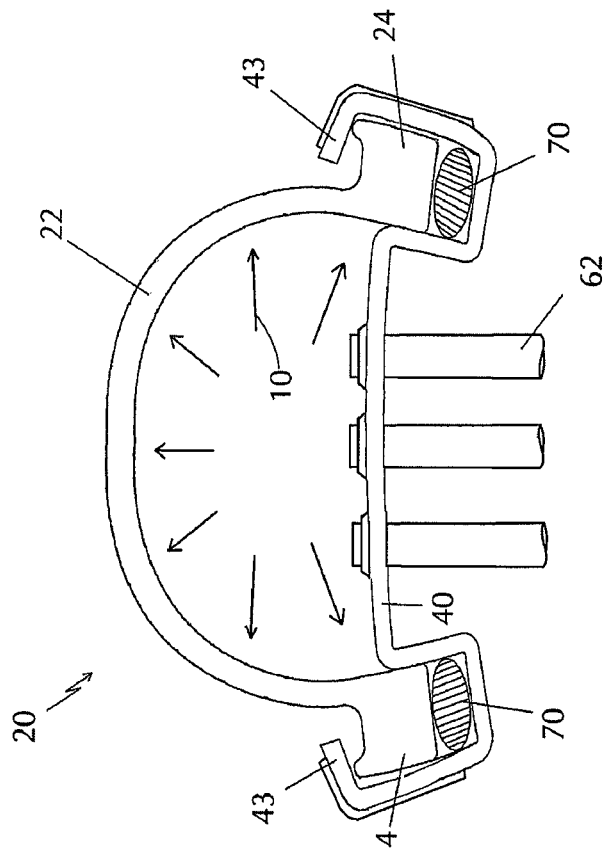
FIG. 4 is a cross-sectional elevational view of the heat exchanger manifold of FIG. 3, showing header groove distortion and seal leakage during heat exchanger operation as a result of internal pressure.
Figure 3:
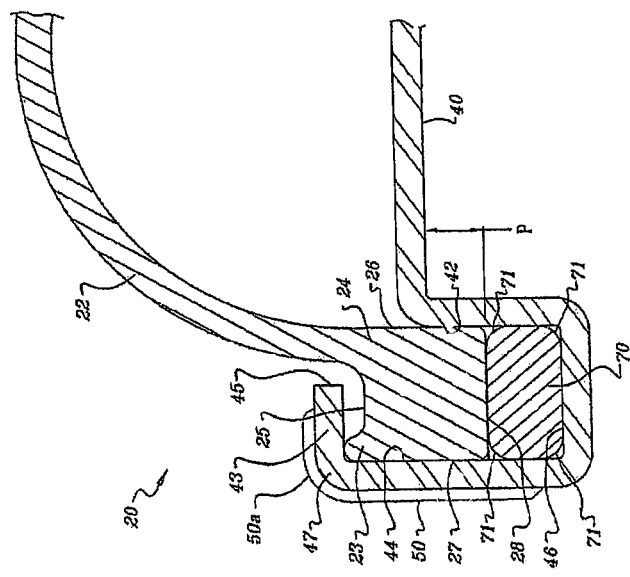
FIG. 3 is a cross-sectional elevational view of a portion of another radiator manifold of the prior art showing one suggested solution for tank-to-header leakage, wherein the header has a deeper header groove and the corresponding tank foot has an increased height providing for deeper penetration within the header groove.

One solution for addressing the overall tank-to-header leakage problem is described in U.S. Pat. No. 7,640,971 to Kolb, entitled "Heat Exchanger Manifold Sealing System." In this potential solution, the tank-to-header leakage problem was addressed by increasing the depth of the header grooves and the height of the tank foot. FIG. 3 shows a cross-sectional elevational view of a portion of the manifold as described in Kolb. As shown in FIG. 3, the header groove is narrow in relation to its depth, preferably having a width to depth ratio of at least about 1.5:1, and the tank foot has a depth of penetration along the groove inner wall, below the entry radius, sufficient to prevent rotational flexing of the foot within the groove when the tank is under pressure. Moreover, the top of the foot of the plastic tank is provided with a small lip or ridge 23 in order to concentrate the tab unbending force close to the bend of the tab. Ridge 23 provides a fulcrum for the bending of the retaining header tabs 43 during manifold assembly. As further shown in FIG. 3, the design may further include at least one stiffening rib 50 having an upper portion extending into tab 43 substantially normal to the direction of the phantom line where tab 43 is bent or crimped over the tank foot. In operation, the result is that the unbending force tends not to unbend the tab, but rather to distort the header groove, as seen in FIG. 4. The header groove distortion may be observed, as in FIG. 4, by a bending of the header groove inner vertical wall inwardly in the direction of the core tubes 62, as well as a separation of the outer surface of the tank foot from the outer wall of the header groove. Such header groove distortion leads to relieving gasket compression and allowing fluid leakage over time.

The present invention remedies some of the deficiencies of the prior art with respect to the effects of internal pressure during operation and is directed to a system and method for fastening and retaining plastic tanks to heavy duty radiator cores which assures structural integrity and seal tightness by reducing deformation of the header groove during operation and use of the heat exchanger. The heat exchanger manifold of the present invention comprises external restraints at critical areas of the header groove formed for securing a tabbed radiator core header to a plastic radiator tank, which aids in providing compression on the rubber gasket and prevents header groove distortion during operation and use of the heat exchanger.

Figure 5:
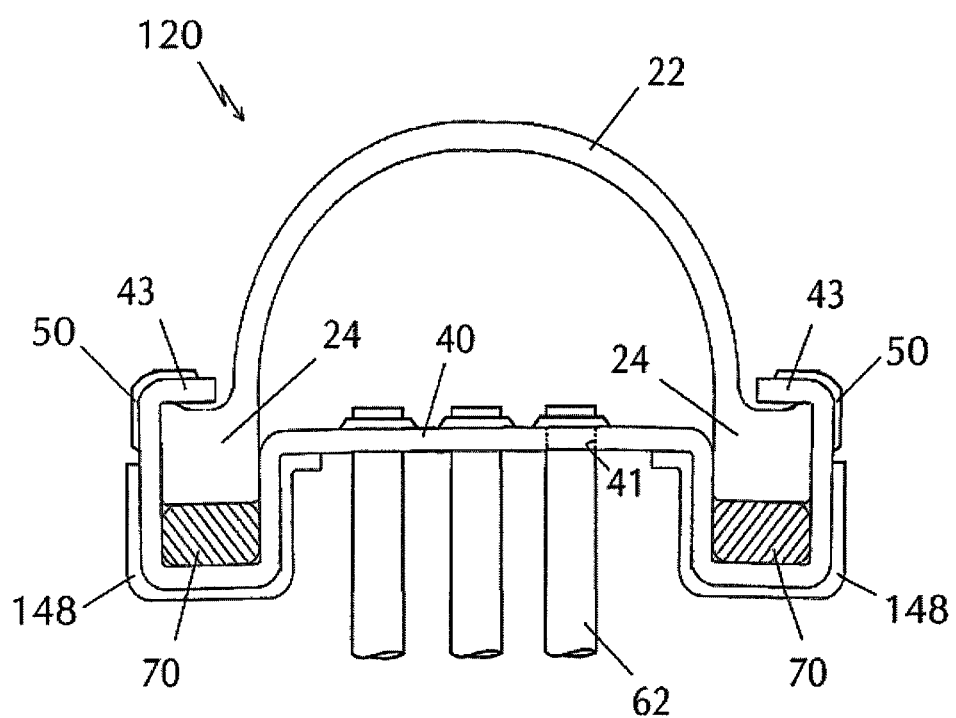
FIG. 5 is a cross-sectional elevational view of a heat exchanger manifold according to an embodiment of the present invention, at rest, showing a plastic radiator tank mated and sealed to a tabbed aluminum radiator core header with rubber sealing gaskets, with a header groove reinforcement member secured to an outer surface of the header groove.
Figure 6:
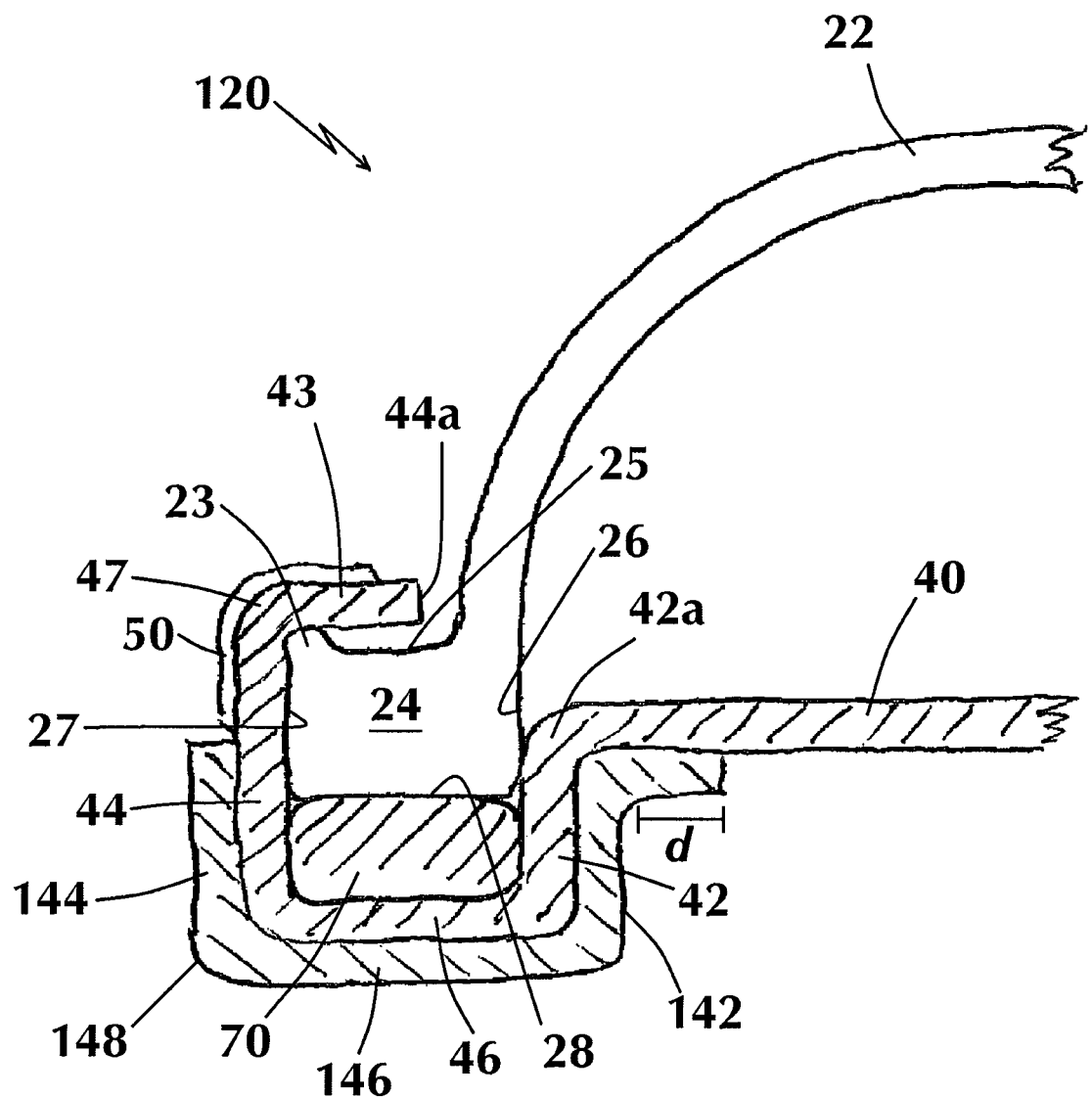
FIG. 6 is a cross-sectional elevational view of a portion of the heat exchanger manifold of FIG. 5, showing a header groove reinforcement member brazed to an outer surface of the header groove according to an embodiment of the present invention.

One embodiment of the heat exchanger manifold 120 of the present invention is shown in FIGS. 5-6, showing a plastic radiator tank attached to an aluminum core header. For clarity, only one section of the manifold is shown to illustrate the method of attachment of the tank to the header; however it should be understood that along the entire periphery of the header, the tank and header are attached in the same manner as shown. An embodiment of the present invention may generally comprise a radiator tank attached to a tabbed radiator core header with rubber gaskets and held in place by crimping the header tabs over a foot or lip surrounding the tank to provide compression on the gasket, as described above. One method for connection of such plastic radiator tanks to tabbed radiator core headers at the tank-to-header joint is also described in U.S. Pat. No. 7,640,971 to Kolb, entitled "Heat Exchanger Manifold Sealing System," the disclosure of which is hereby incorporated by reference. To remedy the deficiencies of the prior art with respect to the effects of internal pressure during operation, the present invention further comprises external restraints at critical areas surrounding the header groove, which aids in maintaining compression on the rubber sealing gasket and prevents header groove distortion during operation and use of the heat exchanger, as will be described in more detail below.

As shown in FIGS. 5-6, tank 22 may be comprised of any suitable polymer, such as a molded plastic. In at least one embodiment, tank 22 is comprised of an otherwise conventional molded plastic such as glass-reinforced Nylon 6/6 material. Tank 22 is elongated such that its length (horizontally in FIG. 5) is greater than its width (vertically in FIG. 5). As shown in FIG. 5, typically, for truck or other heavy-duty radiator applications, the upper surface of the tank 22 has a semicircular configuration as seen in a cross-section normal to the tank length and has a wall thickness typically of about 0.155 in. (3.9 mm) for good stiffness to minimize tank flexing. Tank 22 is secured to header 40, which may be comprised of a sheet metal, such as braze-clad aluminum. A header groove around the periphery of header 40 is positioned to receive a foot or lip 24 of tank 22 to form a seal at the tank and header joint.

The header groove is formed by an inner vertical wall 42, an outer vertical wall 44, and a lower wall 46 disposed between and connecting the vertical walls (FIG. 6). The depth of the groove is the dimension between the top of the header plate 40 and the inner surface of the groove lower wall 46, as shown in FIG. 6. The header plate groove may be narrow in relation to its depth, preferably being as narrow as possible relative to its depth as manufacturing standards would allow. In an embodiment, the ratio of depth to width may be at least about 1.5:1. In a typical truck or heavy-duty radiator application of the present invention, the groove depth is about 0.3 in. (7.6 mm) and the width is about 0.205 in. (5.2 mm). The width of the tank foot 24 is substantially equal to the width of the header groove, so that a sliding contact is created between the inner and outer surfaces 26, 27 of the tank foot and the respective inner and outer walls 42, 44 of the header groove. In at least one embodiment of the present invention, the tank foot may have a penetration along the groove inner wall 42, below the entry radius, of at least about half of the groove depth, or about 0.15 in. (3.8 mm). The depth of penetration is sufficient to prevent rotational flexing of the foot within the groove when the tank is under pressure. The narrow header groove accommodates the tank foot, which substantially reduces any tendency of rotation of the tank foot within the header groove.

In at least one embodiment, a compressible gasket 70, such as a continuous ring-type elastomeric gasket, is positioned in the bottom of the header plate groove, and tank foot or lip 24 is received over the gasket so that the bottom surface of the foot contacts the upper surface of gasket 70. To eliminate gasket deterioration under high coolant operating temperatures, gasket 70 may be made of EPDM rubber, typically in an elliptical cross section. Because of the general incompressibility of rubber, the seal is designed with an elliptical cross section to insure that the void between the tank foot or lip 24 and the header plate groove becomes completely filled by the rubber when the gasket is deformed between the tank foot and the groove side 42, 44 and bottom 46 walls during assembly. To secure the header 40 to the tank 22, tabs 43 are bent inwards and are crimped over the tank foot 24, such that the foot lower surface is forced down against the top of elliptical gasket 70 toward the groove inner bottom surface, causing the elliptical gasket to be deformed so that the gasket fills essentially the entire region between the groove walls 42, 44, 46 and the tank foot lower surface 28, as shown in FIG. 5. In an embodiment, the top of the foot of the plastic tank may be provided with a small lip or ridge 23 in order to concentrate the tab unbending force close to the bend of the tab. Ridge 23 provides a fulcrum for the bending of the retaining header tabs 43 during manifold assembly. In embodiments of the present invention where a ridge 23 is present, the tab 43 is free of contact from the foot upper surface 25 inward of the ridge when the tab is bent inwardly over the tank foot to secure the tank to the header. Sealing stress is created as the rubber gasket pushes out radially against the constraining surfaces of the foot and the header groove. The gasket loading together with the close sliding fit of the tank foot creates a hydraulic lock with the header groove.

It should be understood by those skilled in the art that the method of sealing the tank-to-header joint as described above, e.g. securing a radiator tank to a tabbed radiator core header with rubber gaskets and crimping the header tabs over a foot or lip surrounding the tank to provide compression on the gasket, is only one such method of sealing the tank-to-header joint and that other known methods in the art may also be used in accordance with the objects of the present invention.

To further aid in securing the tank to the radiator core header, as well as maintaining gasket compression and preventing fluid leakage, the manifold of the present invention includes external restraints or reinforcements at critical points around the header periphery, particularly along the outer surface of the header groove. More specifically, a groove reinforcement member is positioned on and secured to an exterior surface of the header groove to serve to increase the thickness of the header wall in this critical area. Reinforcement member 148 extends along at least a portion of the length of header groove outer vertical wall 44, inner vertical wall 42 and lower wall 46, respectively, and further extends at least a portion of the length of header plate 40 in the direction of the core tubes (not shown in FIG. 6). For clarity, the tubes of the radiator core are not shown; however it should be understood by those skilled in the art that a plurality of core tubes are connected to and sealed within tube openings within the header plate periphery, as shown in FIG. 5.

In one or more embodiments, the header plate 40 and reinforcement member 148 may both be made of a sheet metal, for instance braze-clad aluminum, and the reinforcement member may be brazed to the outer surface of the header groove during core brazing. As such, the added cost of material is minimal, and much less than increasing the thickness of the entire header wall (as in some prior art designs), and there is no additional cost for brazing the reinforcement member to the header during core brazing. Moreover, the labor cost involved in assembly is less than that for providing steel crimp strips, as used in many prior art designs.

As shown in the isolated view of FIG. 6, reinforcement member 148 may have a first portion 144 extending along at least a portion of the length of outer vertical wall 44 in the direction of the distal end 44*a*, but stopping below phantom line 47 where tab 43 is bent inward over the top surface 25 of tank foot 24. Reinforcement member 148 further has a second portion 142 extending past the proximal end 42*a* of the inner vertical wall 42 to a distance d along the length of header plate 40 in the direction of the core tubes, transverse to the header groove, and ending at a distance prior thereto. As further shown in FIG. 6, the midportion 146 of the reinforcement member may span the length of the groove lower wall 46. It should be understood by those skilled in the art that the distance to which reinforcement member 148 extends along the length of the groove outer vertical wall 44 in one direction and along the length of header plate 40 in the opposite direction, may be a matter of design choice, made to ensure maximum support and reinforcement along the header groove in accordance with operational requirements of the heat exchanger.

Preferably, reinforcement member 148 is positioned such that the thickness of the header groove walls is increased by a ratio of at least about 2:1, thereby substantially preventing distortion of the header groove during operation of the heat exchanger caused by internal pressure tending to bend the header groove inner wall 42 in the direction of the heat exchanger core tubes, while still maintaining seal compression between the tank 22 and the header 40. When header groove distortion is minimized using the groove reinforcement member of the present invention, it has been found to no longer be necessary to provide the header groove having an increased depth or tank having an elongated tank foot of manifolds of the prior art, such as U.S. Pat. No. 7,640,971 to Kolb.

As further shown in FIGS. 5-6, in one or more embodiments, manifold 120 may further include at least one stiffening rib 50 for further tab strength against tab unbending. Rib 50 extends over a portion of tab 43, substantially normal or perpendicular to the direction of phantom bend line 47. The rib may be formed by embossing or otherwise plastically deforming the groove outer vertical wall 44, and may be included on all or fewer than all of the tabs 43.

For exemplary purposes, FIG. 6 shows only an isolated portion of the assembled heat exchanger manifold and depicts one side of the header plate having a header groove for mating with the foot of a tank, with a corresponding header groove reinforcement member secured to the outer surface of the header groove; however it should be understood by those skilled in the art that the present invention is not limited to a single reinforcement structure as described, and that the header groove along the entire periphery of the header plate may be reinforced in the same manner.

Thus, the present invention achieves one or more of the following advantages. The present invention provides an increase in strength at the header groove, at minimum cost in material and labor. By brazing the header groove reinforcement to the header groove, the added cost of materials is minimal, and the assembly cost is far less than would be required to add steel crimp strips, for example, or to increase the thickness of the header plate overall. Moreover, the strength of the header groove against distortion is greatly improved by essentially doubling the thickness in the header plate 40 in critical areas, including at the proximal end of the header groove inner vertical wall where the wall meets the header plate, resulting in maintaining tank-to-header seal integrity for a much longer time than with prior art manifold designs. Another advantage of the present invention is that the production of existing tanks, headers and gasket seals does not need to be changed to add the additional production step of brazing the header groove reinforcement member to the outer surface of the header groove. In certain embodiments, existing manifolds may be retrofitted to include the header groove reinforcement member of the present invention.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A heat exchanger manifold comprising:
    a header having a header plate with a periphery, a plurality of tube openings within the header plate periphery adapted to connect to tubes of a heat exchanger core, and a groove around the periphery of the header plate, the groove comprising inner and outer vertical walls and a lower wall disposed therebetween and having a groove depth defined between a top surface of the header plate and an inner surface of the lower wall;
    a tank having an opening for mating with the header and a foot extending around a periphery of the opening and received in the header groove;
    at least one plastically deformable tab extending from an edge of the header groove and being bent inward over the tank foot to secure the tank to the header; and a header groove reinforcement member secured to and extending along an outer surface of the header groove, and further contacting and extending along at least a portion of a length of the header plate beyond the header groove inner vertical wall in a direction transverse to the header groove depth.

2. The heat exchanger manifold of claim 1 wherein the header groove reinforcement member comprises a first portion extending along at least a portion of a length of the outer vertical wall in the direction of a distal end of the outer vertical wall, and a second portion extending past a proximal end of the inner vertical wall and along at least a portion of the length of the header plate.

3. The heat exchanger manifold of claim 2 wherein the header groove reinforcement member first portion ends at a distance from the outer vertical wall distal end.

4. The heat exchanger manifold of claim 2 wherein the header groove reinforcement member second portion ends at a distance from a first of the plurality of tube openings within the header plate periphery.

5. The heat exchanger manifold of claim 2 wherein the header groove reinforcement member further has a midportion spanning a length of the header groove lower wall.

6. The heat exchanger manifold of claim 1 wherein the header and header groove reinforcement member are each comprised of a metal sheet, and wherein the header groove reinforcement member is brazed to the outer surface of the header groove during core brazing.

7. The heat exchanger manifold of claim 1 wherein the header groove reinforcement member is positioned to increase a thickness of the header along the header groove by a ratio of at least about 2:1.

8. The heat exchanger manifold of claim 1 wherein the header groove reinforcement member is positioned on the outer surface of the header groove to prevent distortion of the header groove during operation of the heat exchanger caused by internal pressure attempting to bend the header groove inner vertical wall inwardly in the direction of the heat exchanger core tubes.

9. The heat exchanger manifold of claim 1 further including a resilient sealing gasket between the tank foot and the header groove to seal the tank to the header.

10. A header for a heat exchanger manifold, comprising:
a header plate with a periphery, a plurality of tube openings within the header plate periphery adapted to connect to tubes of a heat exchanger core, and a groove around the periphery of the header plate to receive a foot of a tank, the groove comprising inner and outer vertical walls and a lower wall disposed therebetween and having a groove depth defined between a top surface of the header plate and an inner surface of the lower wall; and
a header groove reinforcement member secured to and extending along an outer surface of the header groove and further contacting and extending along at least a portion of a length of the header plate beyond the header groove inner vertical wall in a direction transverse to the header groove depth.

11. The header of claim 10 wherein the header groove reinforcement member comprises a first portion extending along at least a portion of a length of the outer vertical wall in the direction of a distal end of the outer vertical wall, and a second portion extending past a proximal end of the inner vertical wall and along at least a portion of the length of the header plate.

12. The header of claim 11 wherein the header groove reinforcement member first portion ends at a distance from the outer vertical wall distal end.

13. The header of claim 11 wherein the header groove reinforcement member second portion ends at a distance from a first of the plurality of tube openings within the header plate periphery.

14. The header of claim 11 wherein the header groove reinforcement member further has a midportion spanning a length of the header groove lower wall.

15. The header of claim 10 wherein the header and header groove reinforcement member are each comprised of a metal sheet, and wherein the header groove reinforcement member is brazed to the outer surface of the header groove during core brazing.

16. The header of claim 10 wherein the header groove reinforcement member is positioned to increase a thickness of the header along the header groove by a ratio of at least about 2:1.

17. A method of assembling a heat exchanger manifold comprising:
providing a header having a header plate with a periphery, a plurality of tube openings within the header plate periphery adapted to connect to tubes of a heat exchanger core, and a groove around the periphery of the header plate, the groove comprising inner and outer vertical walls and a lower wall disposed therebetween and having a groove depth defined between a top surface of the header plate and an inner surface of the lower wall, and at least one plastically deformable tab extending from an edge of the header groove;
providing a header groove reinforcement member having first and second portions adapted to be secured to an outer surface of the header groove;
providing a tank having an opening for mating with the header and a foot extending around a periphery of the opening and received in the header groove;
securing the header groove reinforcement member to the outer surface of the header groove such that the header groove reinforcement member first portion extends along at least a portion of a length of the header groove outer vertical wall in the direction of a distal end of the outer vertical wall, and the second portion extends past a proximal end of the header groove inner vertical wall and contacts and extends along at least a portion of the length of the header plate beyond the header groove inner vertical wall in a direction transverse to the header groove depth; and
mating the tank to the header so that the tank foot is received in the header groove; and
bending an upper portion of the at least one tab inward over the tank foot to secure the tank to the header.

18. The method of claim 17 wherein the header and header groove reinforcement member are each comprised of a metal sheet, and wherein securing the header groove reinforcement member to the outer surface of the header groove comprises brazing the header groove reinforcement member to the outer surface of the header groove during core brazing.

19. The method of claim 17 further including securing the header groove reinforcement member to the outer surface of the header groove such that the header groove reinforcement member first portion ends at a distance from the outer vertical wall distal end and second portion ends at a distance from a first of the plurality of tube openings within the header plate periphery.

20. The method of claim 17 wherein the tank foot has a flat lower surface and further including, prior to mating the tank to the header, placing in the header groove a resilient sealing gasket, the gasket having an elliptical cross section in an undeformed state; and subsequent to mating the tank to the header, deforming the sealing gasket by contact with the tank foot to fill essentially an entire region between the header groove and the tank foot flat lower surface and seal the tank to the header.

* * * * *